United States Patent [19]

Suzuki et al.

[11] Patent Number: 5,704,411
[45] Date of Patent: Jan. 6, 1998

[54] METHOD AND SYSTEM FOR HEATING INGOT FOR METAL INJECTION MOLDING

[75] Inventors: Atsushi Suzuki; Kazuya Sakamoto; Shinji Kazama; Nobumasa Hamazoe; Masayoshi Kai, all of Sayama, Japan

[73] Assignee: Honda Giken Kogyo Kabushiki Kaisha, Tokyo, Japan

[21] Appl. No.: 621,839

[22] Filed: Mar. 22, 1996

[30] Foreign Application Priority Data

Mar. 22, 1995 [JP] Japan .................................. 7-063196
Mar. 24, 1995 [JP] Japan .................................. 7-065957

[51] Int. Cl.$^6$ .................................................. B22D 17/00
[52] U.S. Cl. .......................... 164/4.1; 164/113; 164/154.6; 164/900
[58] Field of Search .................. 164/4.1, 900, 71.1, 164/155.6, 154.6, 457, 312, 113

[56] References Cited

FOREIGN PATENT DOCUMENTS 5-285625  11/1993  Japan .

Primary Examiner—Kuang Y. Lin
Attorney, Agent, or Firm—Merchant, Gould, Smith, Edell, Welter & Schmidt, P.A.

[57] ABSTRACT

A method for heating a metal ingot for a injection molding comprising steps of finding out a time in advance relating to the time required for heating up to a set temperature in a test by using a thermocouple and a timer in a test furnace, of heating the ingot to the set temperature by heating it for that period of time in an actual furnace and of measuring a temperature at that time by a radiation thermometer to reserve the temperature based on the measurement. Further, it comprises steps of detecting an oxygen concentration within an atmosphere of the heating chamber after evacuating the heating chamber of the metal ingot to fill with an inert gas and of controlling power fed to an induction heating coil to heat the metal ingot when the detected oxygen concentration within the atmosphere is below a predetermined value.

2 Claims, 10 Drawing Sheets

METHOD AND SYSTEM FOR HEATING INGOT FOR METAL INJECTION MOLDING

BACKGROUND OF THE INVENTION

1. Field of the Invention

The present invention relates to a method for heating an ingot for metal injection molding, in which a metal ingot is heated to a predetermined temperature and maintained at substantially that temperature, and to a metal heating system in which the generation of oxides is suppressed by detecting an oxygen concentration prior to heating.

2. Description of the Related Art

Upon heating an ingot of a magnesium (Mg) or aluminum (Al) alloy (hereinafter simply called "ingot") and maintaining the same at a given temperature, it is important to be aware of an accurate temperature of the metal ingot so as to provide a high quality mold. Thus, conventionally, arrangements have been made such that the temperature of the ingot, heated by an induction heater or a resistance heater, is measured by means of a radiation thermometer. Its temperature is brought up to a predetermined level by controlling the supply of power to the heater, and the temperature is maintained for a predetermined period of time. The radiation thermometer referred to herein represents an instrument for measuring an apparent temperature of an article by observing its thermal radiation.

However, because emissivity changes depending on shape, surface roughness and surface condition of an ingot, temperature represented by the radiation thermometer fluctuates. While a correct temperature may be found out by burying a thermocouple directly into the ingot and by measuring the temperature thereof, it must be removed from the ingot in order to crush the ingot in succession thereafter and it has been difficult to carry out such work in a consecutive process.

Hitherto, an inert gas is filled into the heating chamber in advance after evacuating it to prevent oxidation of the metal ingot in heating it. However, because a concentration of oxygen in the atmosphere of the heating chamber was not confirmed with that method, a defective molding was sometimes produced due to oxides generated by oxygen in the atmosphere. Another problem is that a magnesium or aluminum alloy, for example, may go up in flames.

SUMMARY OF THE INVENTION

It is therefore an object of the present invention to provide a method and a system which enable a metal ingot to be heated at a predetermined temperature without concern about dispersion of temperature indicated by the radiation thermometer while heating the ingot and while measuring the temperature thereof and which enable the temperature to be reserved thereafter with less fluctuation.

Another object of the present invention is to provide a method and a system which enable molding of the ingot safely, in addition to that is preventing defective moldings from being produced by suppressing oxide from being produced by detecting an oxygen concentration before heating the metal ingot.

According to a first aspect of the present invention, there is provided a method of heating an ingot for metal injection molding, in which an advance test is conducted in a test furnace of the same type as an actual furnace to detect, using a thermocouple and a timer, a time involved in heating the ingot up to a set temperature thereof, and then the ingot is heated in the actual furnace for the detected time until it reaches the set temperature, whereupon the temperature of the ingot is measured by means of a radiation thermometer for maintaining the ingot at the measured temperature.

According to a second aspect of the present invention, there is provided a metal ingot heating system comprising an oxygen sensor for sensing an oxygen concentration within an atmosphere of a heating chamber and a control circuit operable to energize an induction heating coil to heat the metal ingot when the sensed oxygen concentration within the atmosphere is lower than a predetermined value.

BRIEF DESCRIPTION OF THE DRAWINGS

The specific nature of the invention, as well as other objects, uses and advantages thereof, will clearly appear from the description thereof and from the accompanying drawings, in which.

DETAILED DESCRIPTION OF THE INVENTION

Figure 1:
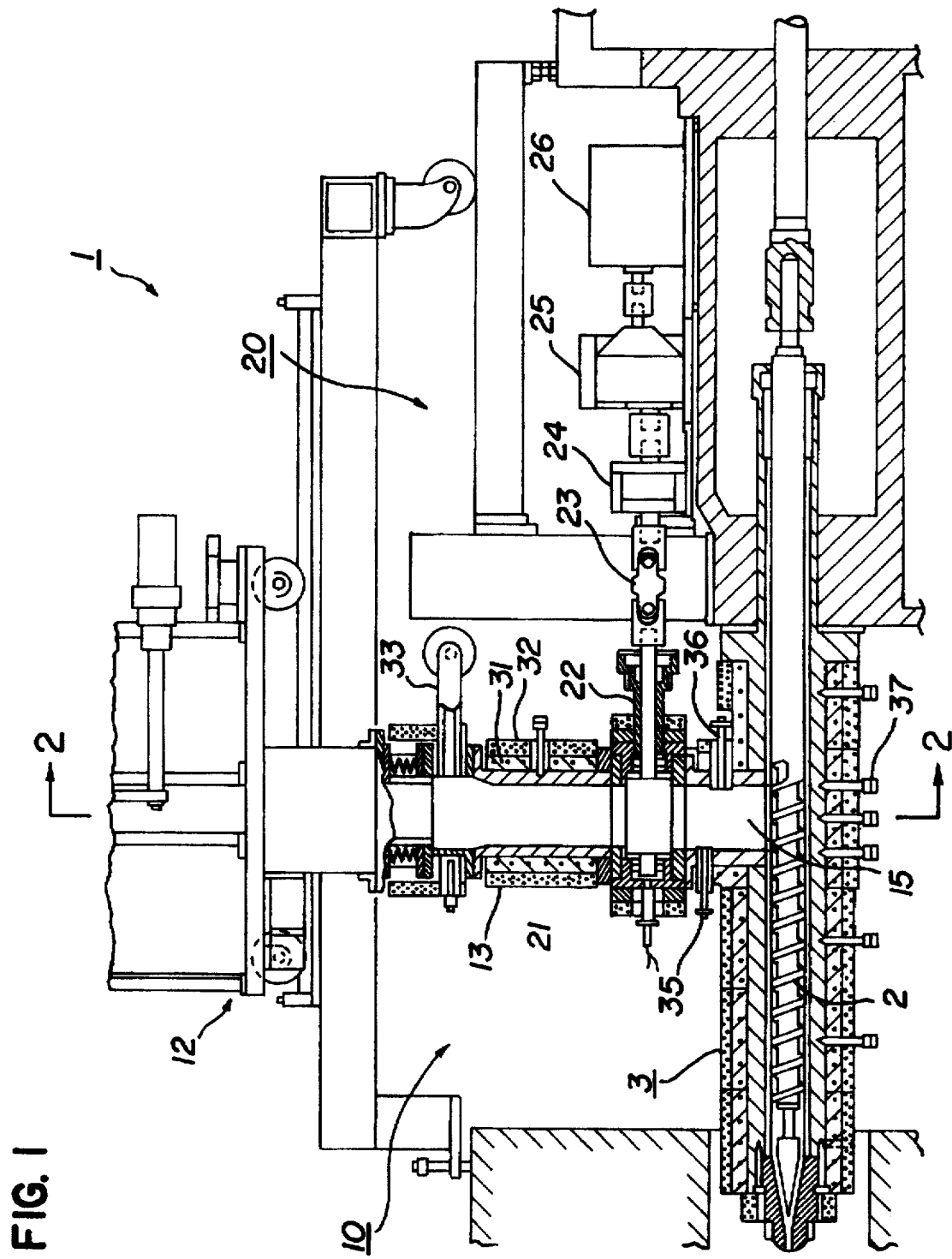
FIG. 1 is a sectional view of a main part of an injection molding apparatus to which an inventive method for heating an ingot of a metal injection molding is applied.

Referring to FIG. 1, an injection molding apparatus 1 is equipped with an injector 3 containing a screw 2 and a material supplying chamber 10 for supplying raw materials to the injector 3. The material supplying chamber 10 has, from top bottom thereof, an ingot introducing chamber 11 (see FIG. 2), a heating chamber 12 as an actual furnace, a heat insulating chamber 13 and a chopping chamber 15 equipped with choppers 21.

The heat insulating chamber 13 is surrounded by a heat reserving heater 31 and a cylindrical heat insulator 32, has a height for fully storing one ingot, and is connected with a vacuum and gas pipe 33 at the upper part thereof. Evacuation is carried out or an inert gas is supplied via the vacuum and gas pipe 33 by switching it.

The chopping chamber has a high-position level sensor 35 and a low-position level sensor 36 separated from each other in the direction of height thereof. Thermometers 37 for measuring a temperature distribution in the axial direction of the injector 3 are arranged in the axial direction.

The choppers 21 are head members of crushing means 20 and are connected to a motor 26 via a driving shaft 22, a swivel shaft 23, a biaxial gear case 24 and an decelerator 25. The biaxial gear case 24 is an output distributor having one input axis and two output axes and the two choppers 21 are rotated in the opposite direction from each other by one motor 26.

Figure 2:
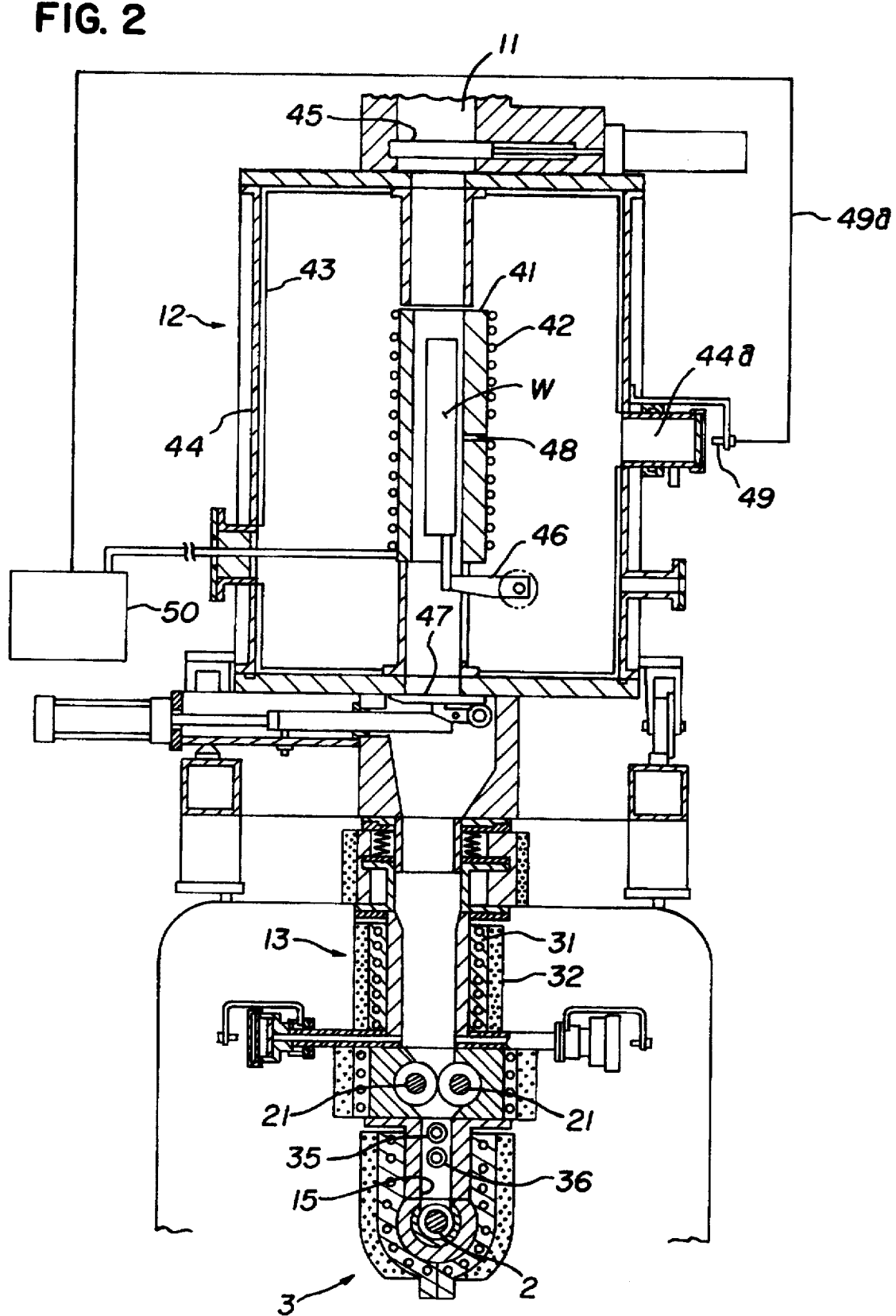
FIG. 2 is a sectional view taken along line A—A in FIG. 1.

In FIG. 2, the heating chamber 12 is a vacuum heating container having a cylindrical ceramic holder 41, an induction heating coil 42, a magnetic shielding material 43 and an outer cylinder 44. An upper shutter 45 is provided above the heating chamber 12, an ingot stopper 46 is provided within it and a lower shutter 47 is provided at the bottom thereof, respectively.

Further, provided on the outside of the heating chamber 12 is a radiation thermometer 49 for measuring a temperature of an ingot W, via an opening 48 perforated radially through the holder 41 and a radiant heat outlet 44a formed on the outer cylinder 44, and for outputting a signal 49a which corresponds to the measured temperature. The radiation thermometer 49 is connected with an induction heating control section 50.

The induction heating control section 50 is connected to the induction heating coil 42 to control power fed to the induction heating coil 42 based on the signal 49a from the radiation thermometer 49.

Figure 3:
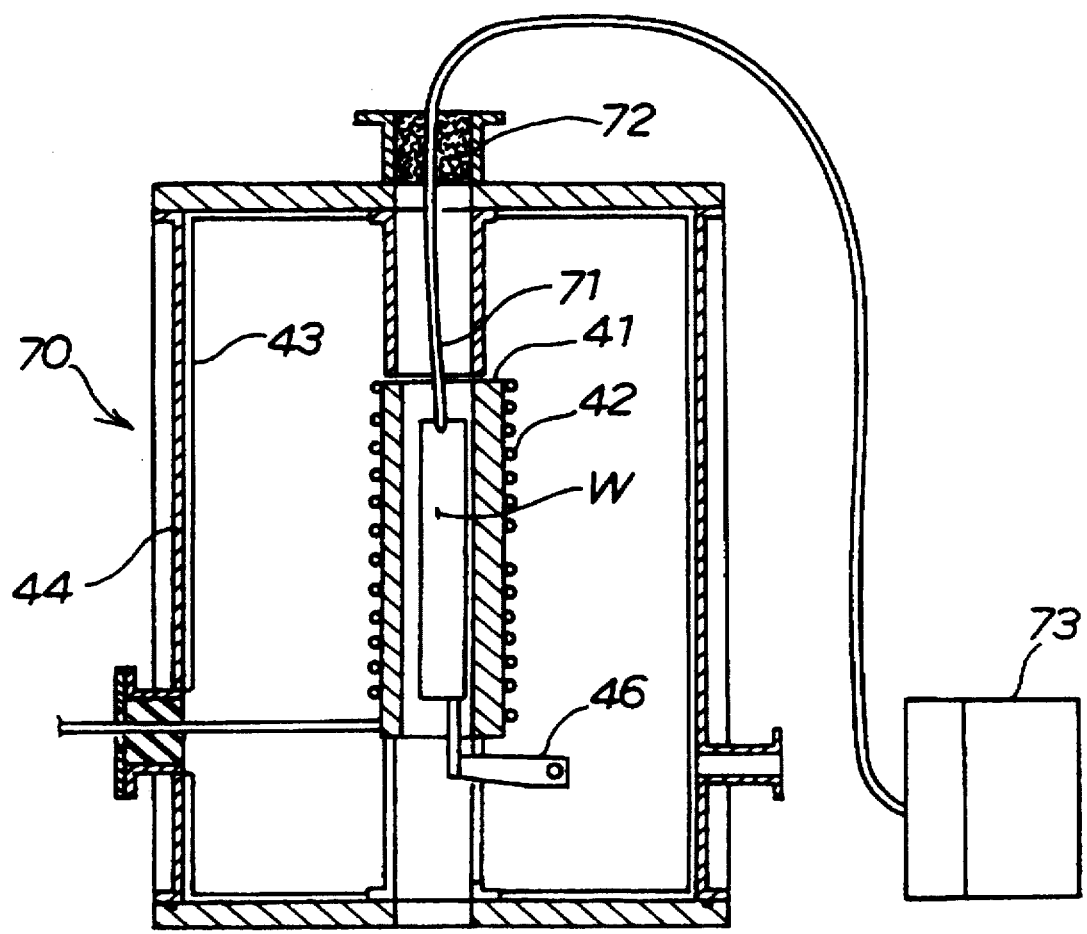
FIG. 3 is a sectional view of a heating chamber as a test furnace.

FIG. 3 is a section view of a heating chamber of a test furnace, wherein the same reference numerals denote the corresponding parts in the heating chamber 12. The heating chamber 70 of the test furnace has the same shape, volume and material with the heating chamber 12 of the actual furnace. While temperature of the ingot W is measured by using the radiation thermometer 49 in the heating chamber 12, it is measured by using a thermoelectric thermometer 71 utilizing a thermocouple in the heating chamber 70. A material and a wire diameter which will not be affected by the induction heating are used for the thermoelectric thermometer 71.

Essentially, one end of the thermoelectric thermometer 71 is inserted in the ingot W via an upper opening of the heating chamber 70 closed by a glass wool 72 and the other end thereof is connected with an indicator. Then, although not shown, the induction heating coil 42 is controlled by the induction heating control section in the same manner as the case of the actual furnace.

Figure 4:
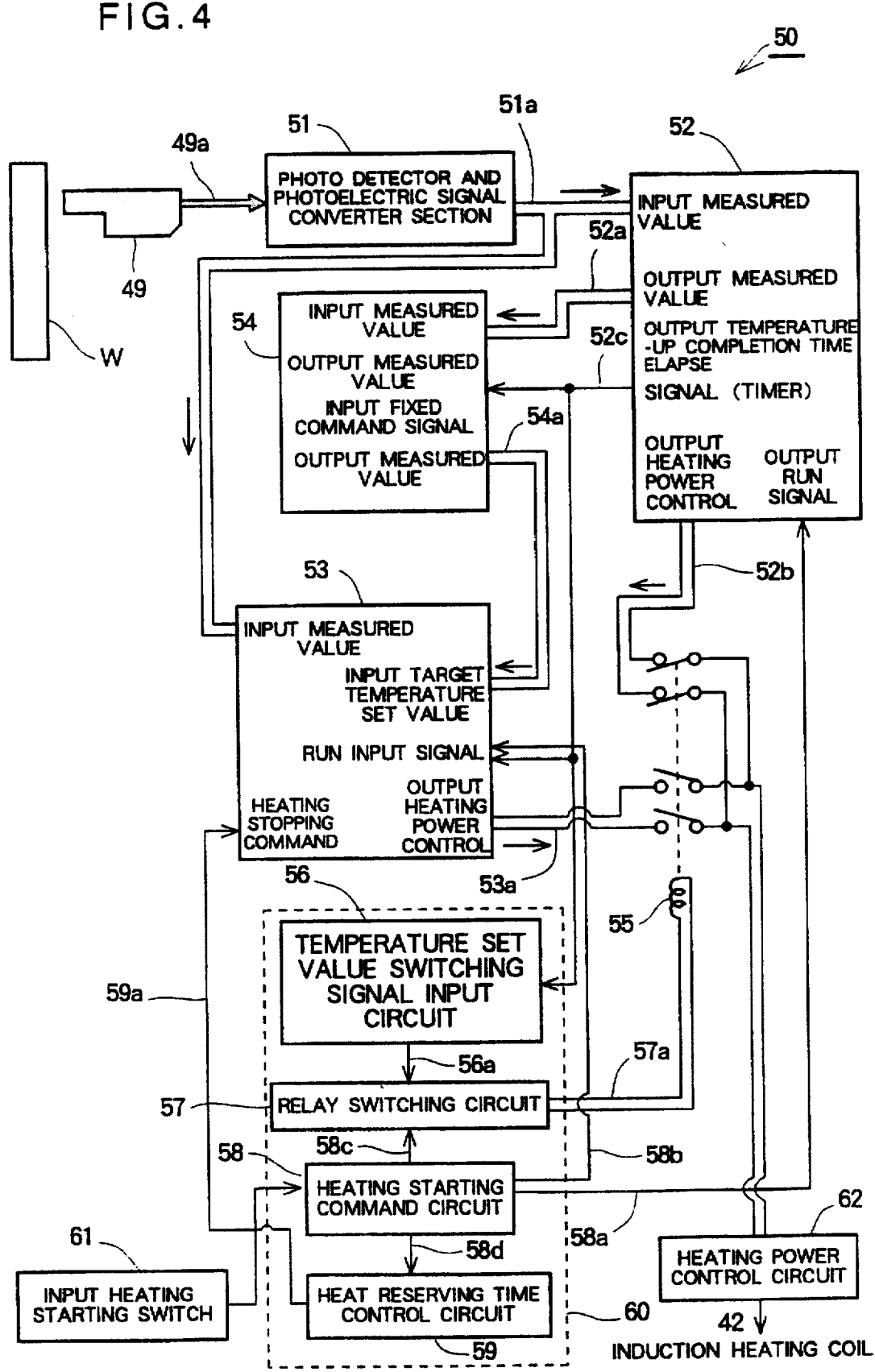
FIG. 4 is a block diagram illustrating the arrangement of a control system of an induction heating control section.

FIG. 4 is a block diagram illustrating the construction of a control system of the induction heating control section 50.

The induction heating control section 50 comprises a photo detector and photoelectric signal converter section (hereinafter referred to as a signal converter section) 51, a target temperature programmed temperature regulator (hereinafter referred to as a programmed temperature regulator) 52, a target temperature set value externally inputting temperature regulator (hereinafter referred to as an externally inputting temperature regulator) 53, an analog memory 54, a sequencer 60 and a relay 55.

The signal converter section 51 receives via an optical fiber 49a light output from the fiber radiation thermometer (radiation thermometer 49) which has measured a temperature of the ingot W and converts the light into an electrical signal to be output as a measured temperature signal 51a.

The programmed temperature regulator 52 receives the measured temperature signal 51a as a measurement and outputs it to the analog memory 54 as a measured temperature signal 52a. A timer (not shown) is provided within the programmed temperature regulator 52. It starts to time when a heating starting command signal (RUN signal) 58a is input in heating and reserving a temperature in the actual furnace and is reset when a time t1, found out based on a map (described later) prepared in advance, elapses. It is noted that the timer is reset in the initial state.

After receiving the heating starting command signal 58a and starting to time, the programmed temperature regulator 52 compares a time being timed by a PID adjustor or the like with the heating time t1 found out from the map and controls power fed to the induction heating coil 42 by outputting a heating power control signal 52b through heating power control means 62 composed of a relay and the like for example until when the temperature reaches to the heating time t1. When it reaches to the heating time t1, the programmed temperature regulator 52 outputs a temperature-up time elapse signal 52c to the analog memory 54. The analog memory 54 is composed of an A/D Converter, a digital memory and a D/A converter for example. Receiving the temperature-up time elapse signal 52c, it stores a measured temperature signal 52a at that time as a target temperature T1 and outputs it as a measurement signal 54a to the externally inputting temperature regulator 53.

The externally inputting temperature regulator 53 compares the measured temperature signal 51a with the measurement signal 54a by a PID controller or the like, computes a degree to be corrected and outputs a heating power control signal 53a to the heating power control means 62 to control the power fed to the induction heating coil 42 so that the target temperature T1 is attained. Further, when the externally inputting temperature regulator 53 receives a stop command signal 59a, it controls the heating power control means 62 through the heating power control signal 53a so as to stop the power fed to the induction heating coil 42.

The sequencer 60 performs a sequential operation corresponding to the test furnace (in preparing the map) and the actual furnace (in heating and reserving temperature) and comprises a temperature set value switching signal input circuit 56, a relay switching circuit 57, a heating starting command circuit 58 and a heat reserving time control circuit 59.

The temperature set value switching signal input circuit 56 outputs a switching command signal 56a when it receives the temperature-up time elapse signal 52c to the relay switching circuit 57.

When the relay switching circuit 57 receives the heating starting command 58c from the heating starting command circuit 58 or the switching command signal 56a from the temperature set value switching signal input circuit 56, it outputs a feeding command signal 57a for switching the programmed temperature regulator 52 and the externally inputting temperature regulator 53 to a relay 55.

When an ingot heating start switch 61 for heating the ingot is turned ON, the heating starting command circuit 58 outputs the heating starting command signals 58a and 58c to connect the programmed temperature regulator 52 to the heating power control means 62. When a heating start command signal 58b for reserving heat is output, it outputs the heating start command signal 58c to the relay switching circuit 57 to connect the externally inputting temperature regulator 53 to the heating power control means 62 and outputs a heating starting command signal 58d to the heat reserving time control circuit 59.

A timer (not shown) which starts to time when the heating starting command signal 58d is input and is reset when a preset time, e.g., three hours, has elapsed is provided within the heat reserving time control circuit 59. When such time elapses, the heat reserving time control circuit 59 outputs a stop command signal 59a to the externally inputting temperature regulator 53.

Operations for preparing the map described above and for heating the ingot and reserving the temperature thereof will be explained below.

Figure 5:
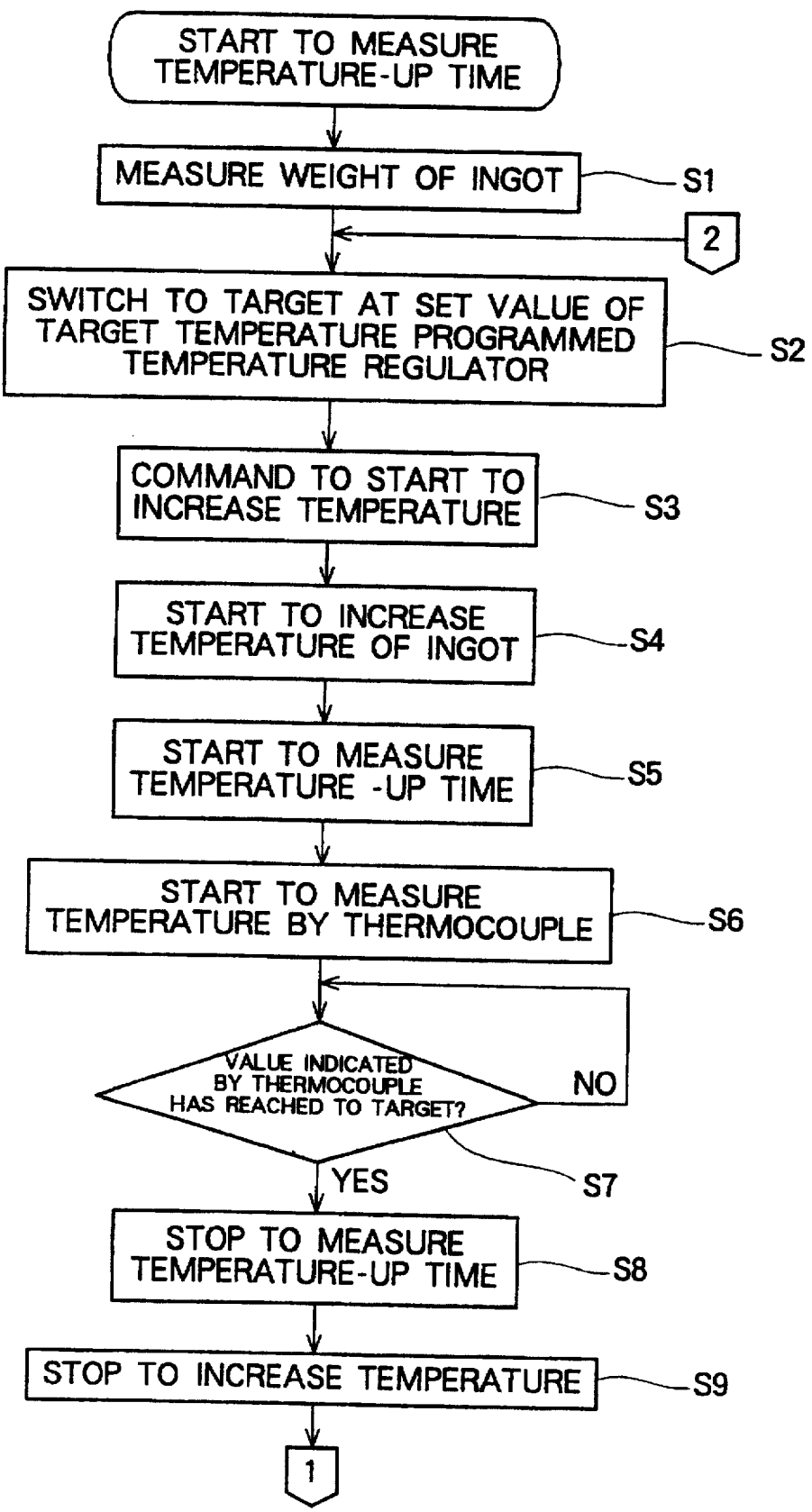
FIG. 5 is a flow chart of a process for preparing a map in a preliminary test.

FIG. 5 is a flow chart in preparing the map in a preliminary test, wherein S1 through S9 denote each step of the sequential operation.

The map is prepared based on the measurement made in the heating chamber of the test furnace constructed as described above before the heating/heat reservation is carried out in the actual furnace and shows a relationship between a heating time until when the ingot is heated up to the set temperature and a weight of the ingot. It is noted that reference will be made to FIGS. 3 and 4 as necessary.

The weight of the ingot W is measured at first in setting a temperature-up time in the test furnace in Step S1. Based on the weight of the ingot, the process is switched so as to target at the set value of the heating time of the programmed temperature regulator 52 in Step S2. The command for starting heating is issued as a heating switch is turned ON in Step S3. Power is then fed to the induction heating coil 42 by the heating command signal and the ingot W is started to be heated in Step S4.

When the temperature begins to be increased, a time needed to reaching the target set temperature is measured by using a stop watch for example in Step S5. At the same time, the temperature of the ingot W begins to be measured by means of the thermoelectric thermometer 71 in Step S6 and when an indicated value of the indicator 73 shows the target set temperature in Step S7, the measurement of the time is stopped in Step S8 and the power fed to the induction heating coil 42 is stopped to stop heating the ingot W in Step S9. The time measured in Step S8 above is considered as the heating time t1.

Figure 6:
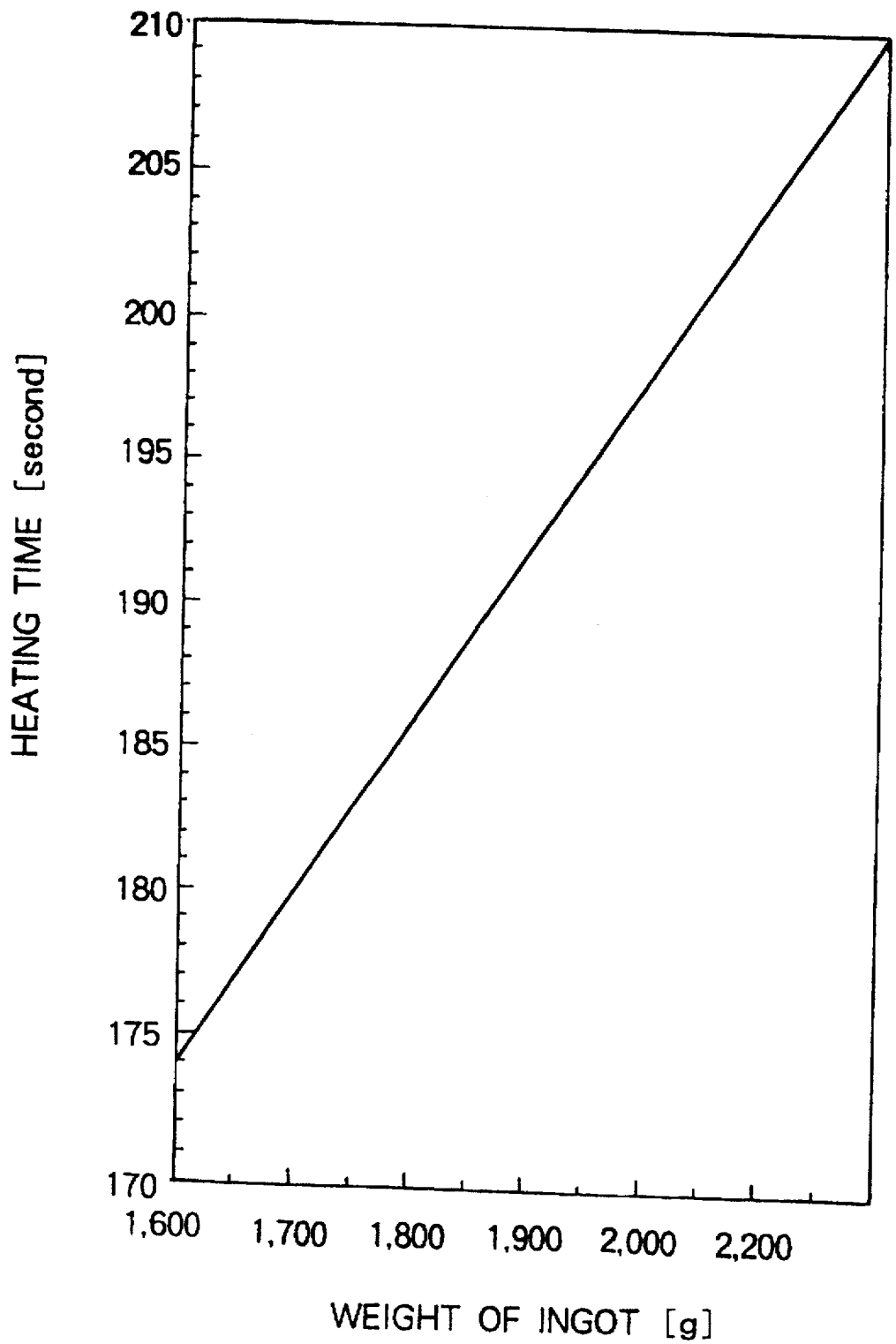
FIG. 6 illustrates an example of the map prepared in the preliminary test.

FIG. 6 shows one example of the map prepared in the preliminary test described above and shows a case when the ingot W is heated from 40° C. to 560° C. Here, the horizontal axis represents the weight of the ingot (in unit of gram) and the vertical axis represents the heating time (in unit of second).

Figure 7:
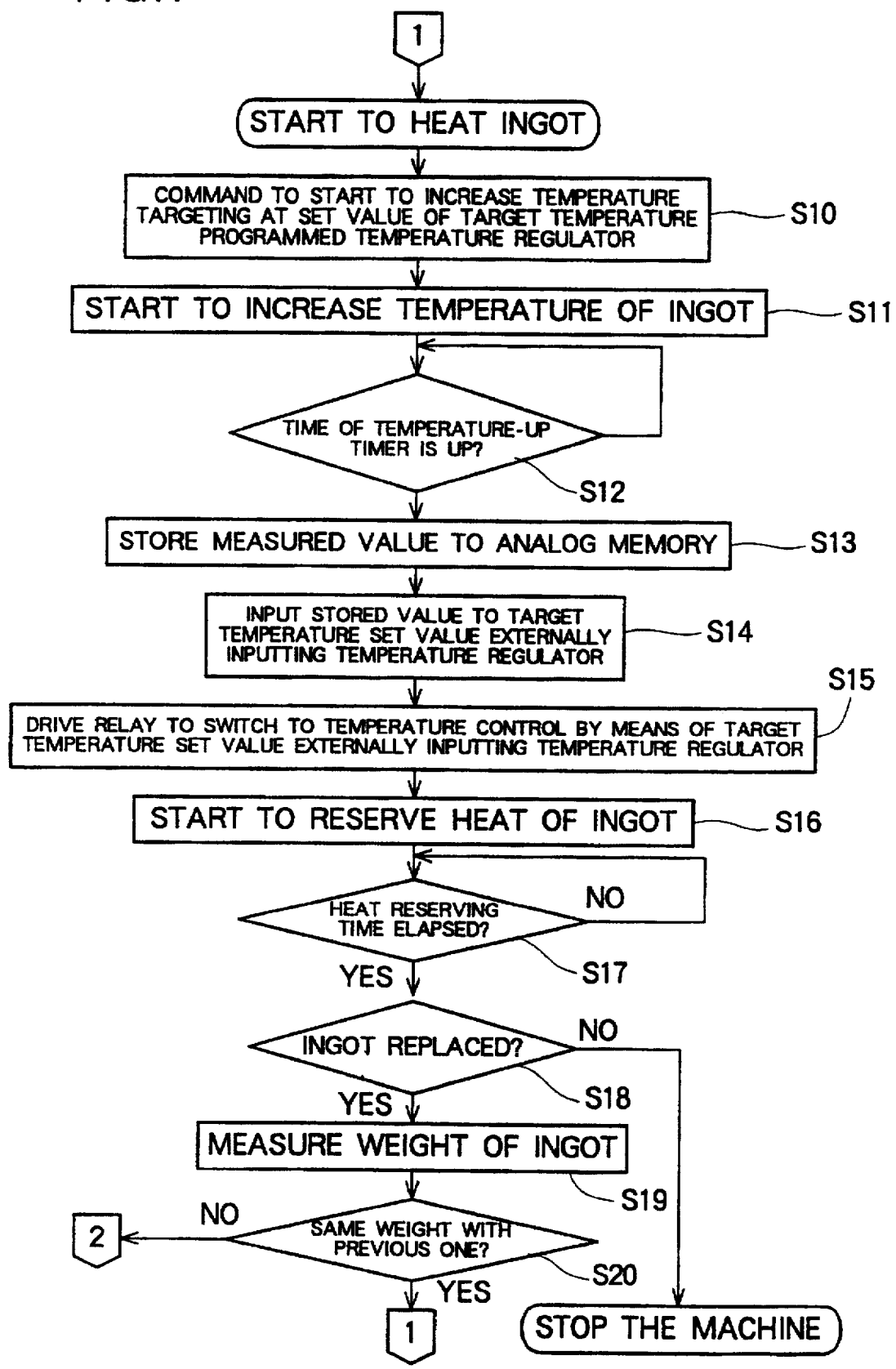
FIG. 7 is a flow chart of heating and heat reserving processes in an actual furnace.

FIG. 7 shows a flow chart in heating the ingot and reserving the temperature thereof in the actual furnace, wherein S10 through S20 denote each step in the sequential operation. It is noted that reference is made to FIGS. 3 and 4, as necessary.

To heat the ingot and to reserve the temperature thereof in the actual furnace, the ingot heating starting switch 61 is turned ON at first, the feeding command signal 57a is output from the relay switching circuit 57 based on the heating starting command signal 58c from the heating starting command circuit 58 and the relay 55 is driven to connect the programmed temperature regulator 52 to the heating power control means 62 in Step S10.

Receiving the heating starting command signal 58a from the heating starting command circuit 58, the programmed temperature regulator 52 outputs the measured temperature signal 52a which corresponds to the temperature of the ingot W measured by the radiation thermometer 49 to the analog memory 54 and outputs the heating power control signal 52b to feed power to the induction heating coil 42 and to start to heat the ingot W in Step S11.

At the same time, the programmed temperature regulator 52 starts to time by the timer, compares a time of the timer with the heating time t1 found out from the map. When the time reaches to the heating time in Step S12, it outputs the temperature-up time elapse signal 52c to the analog memory 54 as a measured output fixing command signal and stores the measured temperature signal 52a in the analog memory 54 as a measured value T1 (target temperature) in Step S13.

This stored measured temperature signal 52a is input to the externally inputting temperature regulator 53 as the measurement signal 54a in Step S14.

The temperature-up time elapse signal 52c is input simultaneously to the externally inputting temperature regulator 53 and the temperature set value switching signal input circuit 56 and the relay 55 is driven via the relay switching circuit 57 to connect the externally inputting temperature regulator 53 to the heating power control means 62 in Step S15.

The externally inputting temperature regulator 53 outputs the heating power control signal 53a to the heating power control means 62 to feed power to the induction heating coil 42 to start to reserve the temperature of the ingot W targeting at the temperature of the above-mentioned measured value T1 in Step S16.

At the same time when the heating starting command signal 58d is input to the heat reserving time control circuit 59, the timer in the heat reserving time control circuit 59 starts to time. After a predetermined time set in advance (Step S17) and when the ingot W is replaced in Step S18, the weight of the ingot W is measured in Step S19. If the weight of the ingot W is the same with that of the previous ingot W, the process returns to the beginning of the flow chart. If it is different at step S20, the process returns to Step S2 to repeat the same process.

When no ingot W is replaced, the stop command signal 59a is output to end the heating (heat reservation) of the ingot, i.e., to stop the machine.

That is, the present invention allows the temperature to be increased in the actual furnace up to the set temperature accurately, similarly to the case when the thermocouple is used, and the temperature to be maintained so that it allows the dispersion of the temperature during heating and heat reservation to be reduced and the quality of metal molding to be improved. Further, because it requires no work of removing the thermocouple or the like, the heating and heat reservation may be carried out in a consecutive process, thus improving the productivity of the metal molding.

Next, a system for heating the metal ingot will be explained.

Figure 8:
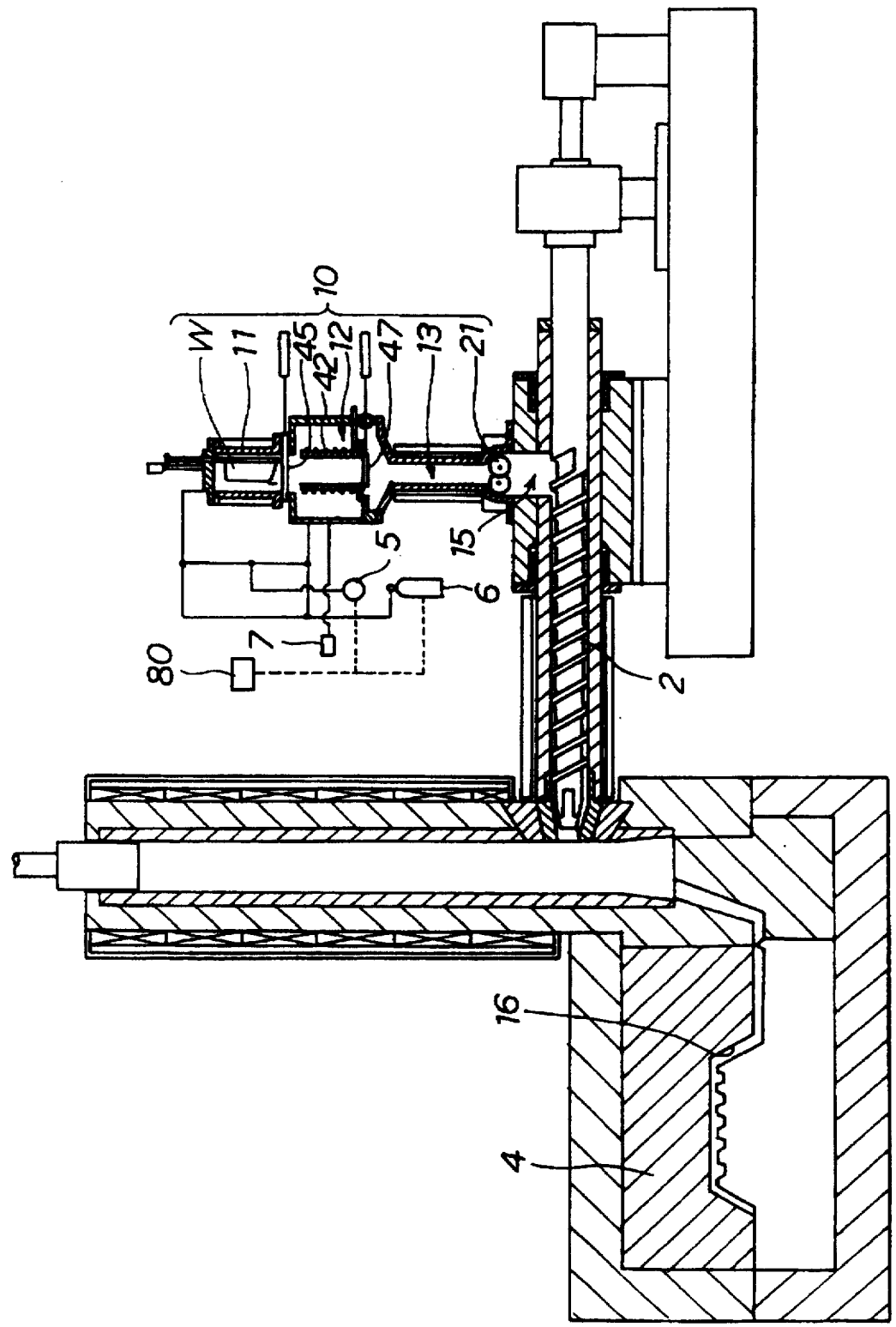
FIG. 8 illustrates the overall arrangement of the injection molding apparatus to which an inventive metal ingot heating system is applied.

In FIG. 8, a die 4 is connected to one end of the screw type injector 3. The metal ingot heating machine comprises a vacuum pump 5, i.e., evacuating means, for evacuating the heating chamber 12, an inert gas cylinder 6, an oxygen sensor 7 and a control circuit 80.

The ingot supplied to the heating chamber 12 from the ingot introducing chamber 11, while being controlled sequentially by the control circuit 80, is heated into a semi-molten state. The semi-molten ingot W is transported down to the heat reserving chamber 13, is crushed by the choppers 21 and is injected via the chopping chamber 15 into a cavity 16 of the die 4 directly or indirectly by the screw 2.

A galvanic cell type oxygen sensor whose structure is simple for example is used for the oxygen sensor 7. A current generated by the oxygen sensor 7 is taken out by converting it into a voltage by a load resistor or by a current amplifier to detect an oxygen concentration having a relationship proportional to the sensor output.

Figure 9:
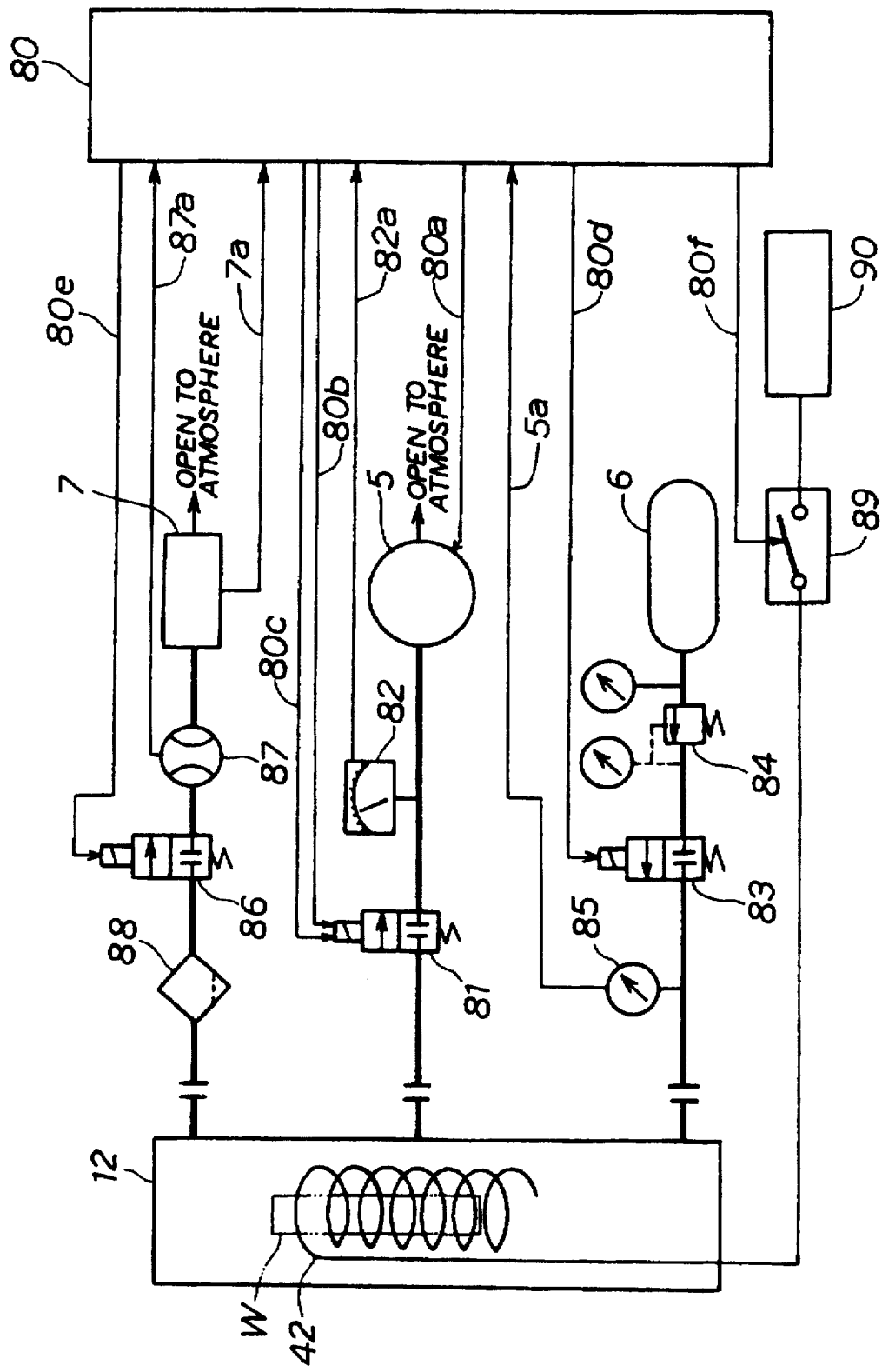
FIG. 9 is a block diagram illustrating the construction of the inventive metal ingot heating system.

FIG. 9 is a block diagram of the inventive metal ingot heating system.

The vacuum pump 5 is connected with the heating chamber 12 via a change-over valve 81 and air within the heating chamber 12 is evacuated when the vacuum pump 5 is driven. A degree of vacuum of the heating chamber 12 is detected by a vacuum guage 82 provided between the vacuum pump 5 and the switching valve 81.

The inert gas cylinder 6 is connected with the heating chamber 12 via a change-over valve 83 to flow an inert gas to the heating chamber 12 while regulating a filling pressure by a pressure control valve 84 provided between the inert gas cylinder 6 and the change-over valve 83. The filling pressure is detected by a pressure guage 85 provided between the heating chamber 12 and the change-over valve 83.

The oxygen sensor 7 is connected with the heating chamber 12 via a change-over valve 86 and detects an oxygen concentration within an atmosphere discharged to the outside passing through a flow meter 87 interposed between the oxygen sensor 7 and the, change-over valve 86. A filter 88 is interposed between the heating chamber 12 and the change-over valve 86.

A switch 89 is interposed between a power circuit 90 and the induction heating coil 42 to supply current to the induction heating coil 42 to heat the ingot W.

The control circuit 80 is connected with the vacuum pump 5, the change-over valves 81, 83 and 86 and the switch 89 to switch them in accordance to a preset sequence. The control circuit 80 is connected also with the vacuum guage 82, the pressure guage 85, the flow meter 87 and the oxygen sensor 7 to determine a degree of vacuum, pressure, flow amount and oxygen concentration at each sequential operation.

Figure 10:
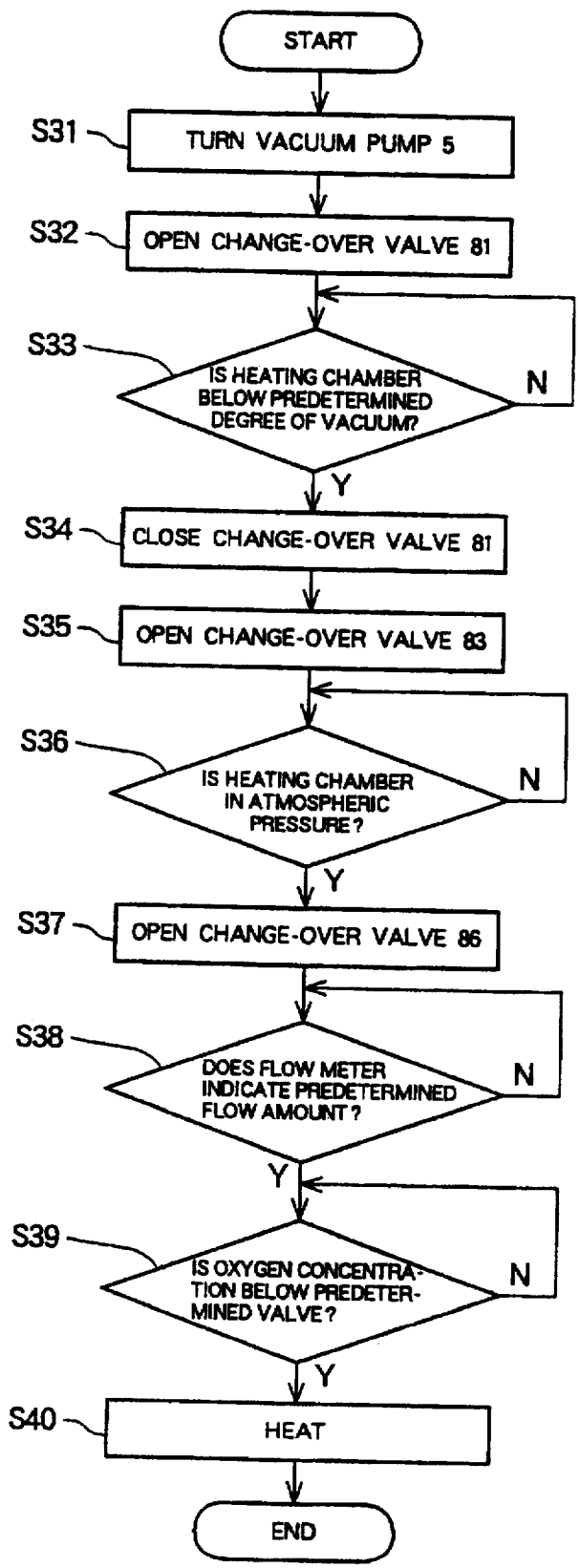
FIG. 10 is a flow chart explaining the sequential operation of the metal ingot heating system.

The sequential operation of the metal ingot heating system constructed as described above will be explained below with reference to FIGS. 9 and 10.

The change-over valves 81, 83 and 86 are closed and the switch 89 is turned OFF in the initial setting in heating the metal ingot.

In a state when the ingot W is sealed in the heating chamber 12, the control circuit 80 outputs a pump operating command signal 80a to the vacuum pump 5 at first to operate the vacuum pump 5 and to start the evacuation of the heating chamber 12 in Step S31.

The control circuit 80 outputs a valve On signal 80b to the change-over valve 81 to open the change-over valve 81 to be ready for the evacuation of the heating chamber 12 in Step S32. At this time, the control circuit 80 monitors a vacuum confirming signal 82a indicating the degree of vacuum from the vacuum guage 82 to confirm the degree of vacuum within the heating chamber 12 with it in Step S33.

Receiving the vacuum confirming signal 82a in H level indicating that the degree of vacuum has reached to a predetermined value, e.g., $10^{-2}$torr, the control circuit 80 outputs a valve Off signal 80c to the change-over valve 81 to close the change-over valve 81 to hold the vacuum state of the heating chamber 12 in Step S34.

Next, the control circuit 80 outputs a valve On signal 80d to the change-over valve 83 to cause the heating chamber 12 to communicate with the inert gas cylinder 6 and to flow the inert gas to the heating chamber 12 while regulating the filling pressure by the pressure regulating valve 84 in Step S35. Because the heating chamber 12 has been evacuated by the evacuation in Step S34 at this time, the inert gas is flowed into the heating chamber 12 quickly.

A gas pressure within the heating chamber 12 is monitored by the control circuit 80 based on a gas pressure confirming signal 85a from the pressure gage 85 (Step S36) and when the gas pressure confirming signal 85a in H level indicating that the pressure within the heating chamber 12 has reached to a certain pressure, e.g., an atmospheric pressure, is input to the control circuit 80, the control circuit 80 outputs a value On receiving signal 80e the change-over valve 86 in Step S37. Then, the control circuit 80 receives a flow amount confirming signal 87a from the flow meter 87 to confirm whether or not an amount of the flowing out inert gas atmosphere has reached a predetermined flow amount in Step S38.

When the amount of the inert gas atmosphere has reached the predetermined amount, the control circuit 80 determines whether the oxygen concentration is less than a predetermined value or not based on an oxygen confirming signal 7a output from the oxygen sensor 7 in Step S39 and when the oxygen concentration within the heating chamber 12 is less than the predetermined value, e.g., less than 10 ppm, control circuit 80 determines that the oxygen concentration is what is allowable to heat by the induction heating coil 42. If the oxygen concentration is more than the predetermined value, the Step S39 is continued.

When the oxygen concentration is determined to be less than the predetermined value in Step S39, the control circuit 80 outputs a heating requesting signal 80f to the switch 89 to close the switch 89 and to heat the induction heating coil 42 in Step S40, thus completing the series of sequences.

It is noted that the signal of the oxygen sensor may be used arbitrarily, not only as the condition for starting heating but also as a condition of an alarm signal in the middle of heating.

As described above, the inventive metal ingot heating system is equipped with the oxygen sensor for detecting an oxygen concentration within an atmosphere of the heating chamber and the control circuit detects the oxygen concentration within the atmosphere of the heating chamber by the oxygen sensor after flowing the inert gas to the heating chamber and before heating the metal ingot, so that the oxygen concentration may be monitored before heating. Accordingly, it allows metal ingots to be heated under an adequate oxygen concentration and good moldings containing no oxide products to be obtained by suppressing the production of the oxide product.

Further, because heating of the heating chamber is started only when the oxygen concentration within the atmosphere of the heating chamber detected by the oxygen sensor is less than the predetermined value according to the present invention, it becomes possible to safely mold even a metal such as a magnesium alloy or an aluminum alloy which burns violently when the oxygen concentration is high and is advantageous in controlling the quality of products.

While preferred embodiments have been described, variations thereto will occur to those skilled in the art within the scope of the present inventive concepts which are delineated by the following claims.

What is claimed is:

1. A method for heating an ingot for injection molding by heating the ingot while measuring a temperature thereof by a radiation thermometer, said method comprising the steps of:

placing the ingot in a test furnace which is a same type of furnace as an actual furnace, and using a thermocouple as a first means for measuring a temperature of the ingot, and heating the ingot for a heating time t1 that ends when a measured value of said thermocouple reaches a set value;

placing said ingot in said actual furnace which is equipped with a radiation thermometer as a second means for measuring a temperature of the ingot, and heating the ingot to obtain a measured value T1 of said radiation thermometer when the ingot has been heated for a time equal to the heating time t1; and continuing heating of said ingot by targeting the temperature T1 of said radiation thermometer as a temperature to be controlled, wherein the ingot is crushed to feed to a screw of an injection molding machine.

2. A method for heating the ingot for injection molding, according to claim 1, wherein said set value is determined based on a map prepared in advance showing a relationship between a weight of the ingot and the heating time.

* * * * *